(12) United States Patent
Liu et al.

(10) Patent No.: US 11,622,499 B2
(45) Date of Patent: Apr. 11, 2023

(54) AUTONOMOUS MOWER

(71) Applicant: Positec Power Tools (Suzhou) Co., Ltd., Suzhou (CN)

(72) Inventors: Fangshi Liu, Suzhou (CN); Yong Shao, Suzhou (CN); Xiahong Zha, Suzhou (CN); Jiaofeng Tian, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 564 days.

(21) Appl. No.: 16/719,728

(22) Filed: Dec. 18, 2019

(65) Prior Publication Data

US 2020/0120863 A1 Apr. 23, 2020

Related U.S. Application Data

(63) Continuation of application No. 16/244,894, filed on Jan. 10, 2019, now abandoned, which is a
(Continued)

(30) Foreign Application Priority Data

Jan. 21, 2014 (CN) .......................... 201410027369.1
Mar. 14, 2014 (CN) .......................... 201410096054.2

(51) Int. Cl.
*A01D 34/00* (2006.01)
*A01D 42/00* (2006.01)
(Continued)

(52) U.S. Cl.
CPC ......... *A01D 34/003* (2013.01); *A01D 34/008* (2013.01); *A01D 42/00* (2013.01);
(Continued)

(58) Field of Classification Search
CPC .... A01D 34/003; A01D 34/008; A01D 42/00; A01D 2101/00; B08B 1/002;
(Continued)

(56) References Cited

U.S. PATENT DOCUMENTS 4,919,224 A 4/1990 Shyu et al.
5,832,708 A 11/1998 Sugden
(Continued)

FOREIGN PATENT DOCUMENTS

CN 1799786 A 7/2006
CN 101091428 A 12/2007
(Continued)

OTHER PUBLICATIONS

Machine translation of JP-2014006689-A.*
(Continued)

*Primary Examiner* — Robert T Nguyen
(74) *Attorney, Agent, or Firm* — Marshall, Gerstein & Borun LLP

(57) ABSTRACT

An autonomous mower including a housing; a mowing module, a traveling module, an information collection device, an energy module, a control module and the control module includes an identification unit, and an alarm module. The autonomous mower has a security patrol working mode in which the identification unit analyzes and judges whether an abnormal object exists in the working area according to the information collected by the information collection device; if the abnormal object exists, the control module controls the alarm module to send an alarm signal to the outside. Therefore, the autonomous mower can achieve a security patrol function in addition to having a function of trimming the lawn. The autonomous mower has multiple uses, so as to save the cost.

13 Claims, 5 Drawing Sheets

Related U.S. Application Data continuation of application No. 15/112,934, filed as application No. PCT/CN2015/071207 on Jan. 21, 2015, now abandoned.

(51) Int. Cl.
| | |
|---|---|
| *G05D 1/00* | (2006.01) |
| *B08B 3/02* | (2006.01) |
| *G08B 13/194* | (2006.01) |
| *B08B 1/00* | (2006.01) |
| *B08B 1/04* | (2006.01) |
| *B08B 5/02* | (2006.01) |
| *B08B 13/00* | (2006.01) |
| *G05D 1/02* | (2020.01) |
| *A01D 101/00* | (2006.01) |

(52) U.S. Cl.
CPC .............. *B08B 1/002* (2013.01); *B08B 1/005* (2013.01); *B08B 1/04* (2013.01); *B08B 3/02* (2013.01); *B08B 5/02* (2013.01); *B08B 13/00* (2013.01); *G05D 1/0011* (2013.01); *G05D 1/0238* (2013.01); *G05D 1/0242* (2013.01); *G08B 13/194* (2013.01); *A01D 2101/00* (2013.01); *B60L 2200/40* (2013.01); *B60L 2250/10* (2013.01); *B60L 2260/32* (2013.01); *G05D 2201/0208* (2013.01)

(58) Field of Classification Search
CPC .. B08B 1/005; B08B 1/04; B08B 3/02; B08B 5/02; B08B 13/00; G05D 1/0011; G05D 1/0238; G05D 1/0242; G05D 2201/0208; G05D 1/0246; G08B 13/194; B60L 2200/40; B60L 2250/10; B60L 2260/32
See application file for complete search history.

(56) References Cited

U.S. PATENT DOCUMENTS

| | | | |
|---|---|---|---|
| 6,527,000 B1 | 3/2003 | Randmae et al. | |
| 7,810,511 B2 | 10/2010 | Fagrenius et al. | |
| 8,139,109 B2 | 3/2012 | Schmiedel et al. | |
| 8,567,963 B1 | 10/2013 | Criscuolo et al. | |
| 9,278,670 B2 | 3/2016 | Hattori et al. | |
| 9,307,368 B1* | 4/2016 | Bartlett | H04W 4/029 |
| 9,358,690 B2 | 6/2016 | Sawada | |
| 2003/0202114 A1 | 10/2003 | Takizawa et al. | |
| 2006/0059880 A1 | 3/2006 | Angott | |
| 2007/0291130 A1 | 12/2007 | Broggi et al. | |
| 2008/0161968 A1 | 7/2008 | Adegbile | |
| 2011/0288684 A1* | 11/2011 | Farlow | G05D 1/0038 901/1 |
| 2012/0000024 A1 | 1/2012 | Layton | |
| 2012/0313779 A1* | 12/2012 | Papaefstathiou | G08B 13/19684 701/25 |
| 2013/0035790 A1* | 2/2013 | Olivier, III | G05D 1/0246 901/1 |
| 2013/0300869 A1 | 11/2013 | Lu et al. | |
| 2014/0015959 A1* | 1/2014 | Durvasula | G05D 1/0038 901/50 |
| 2014/0032033 A1* | 1/2014 | Einecke | A01D 75/185 701/27 |
| 2015/0128547 A1* | 5/2015 | Einecke | G05D 1/0038 901/1 |
| 2015/0198952 A1 | 7/2015 | Einecke et al. | |
| 2015/0201555 A1* | 7/2015 | Willgert | G05D 1/0274 701/26 |
| 2015/0220086 A1* | 8/2015 | Willgert | G05D 1/0238 701/26 |
| 2020/0120863 A1* | 4/2020 | Liu | A01D 34/008 |
| 2022/0167552 A1* | 6/2022 | Frick | H05B 47/19 |

FOREIGN PATENT DOCUMENTS

| | | |
|---|---|---|
| CN | 101135911 A | 3/2008 |
| CN | 101420591 A | 4/2009 |
| CN | 201327585 Y | 10/2009 |
| CN | 201489244 U | 5/2010 |
| CN | 102187289 A | 9/2011 |
| CN | 102771246 A | 11/2012 |
| CN | 202958189 U | 6/2013 |
| CN | 103197672 A | 7/2013 |
| CN | 103425132 A | 12/2013 |
| DE | 102009009964 A1 | 9/2010 |
| DE | 102012020162 A1 | 11/2013 |
| EP | 2286653 A2 | 2/2011 |
| EP | 2899692 A1 | 7/2015 |
| JP | 4623591 B2 | 2/2011 |
| JP | 2014006689 A * | 1/2014 |
| WO | WO-2013081544 A1 | 6/2013 |

OTHER PUBLICATIONS

Extended European Search Report for European Application No. 19213907.9, dated Jun. 9, 2020.
International Search Report for application No. PCT/CN2015/071207, dated Apr. 1, 2015.
European Search Report and Written Opinion for Application No. 15740684.4, European Patent Office, dated Aug. 17, 2017.
Office Communication issued to Application No. EP 19 213 907.9, dated May 20, 2022.

* cited by examiner

AUTONOMOUS MOWER

CROSS-REFERENCE TO RELATED APPLICATION

This is a continuation of U.S. patent application Ser. No. 16/244,894, filed Jan. 10, 2019, which is a continuation of U.S. patent application Ser. No. 15/112,934, filed Jul. 20, 2016, which is the United States national phase of International Patent Application No. PCT/CN2015/071207, filed Jan. 21, 2015, which claims priority to Chinese Patent Application No. 201410027369.1, filed Jan. 21, 2014, and Chinese Patent Application No. 201410096054.2, filed Mar. 14, 2014. The entire contents of each of the foregoing priority applications is hereby incorporated by reference.

TECHNICAL FIELD

The present invention relates to the field of power tools, in particular, to an autonomous mower.

BACKGROUND

As a tool adapted to trim a lawn quickly and efficiently, a mower is widely used in occasions such as urban greening and family weeding. The mower further including an autonomous mower. The autonomous mower can complete the work of mowing the lawn independently, which requires no artificial direct control and operations, has low power, small noise and delicate and nice appearance, and significantly reduces manual operations.

The autonomous mower obtains video and/or images by installing an image acquisition device on the mower, and identifies lawns, obstacles and other objects through colors and/or textures. The main function of the common mower is to achieve automatic mowing, and the function is relatively single. At present, people hope that one device can have many functions to facilitate the use and can save the cost of purchasing other devices again.

As is well-known, the image acquisition device generally including a lens which may lead to unclear images or video in case of uncleanness. The unclear images or video may lead to the autonomous mower's misjudgment of autonomous mower the lawns, the obstacles or the like, with the result that the mower cannot work normally.

SUMMARY

In view of this, it is necessary to provide an autonomous mower having a security patrol working mode.

The present invention provides an autonomous mower which automatically travels and works in a working area, including a housing; a mowing module received in the housing, and performing predetermined mowing work; a traveling module supporting the housing and driving the autonomous mower to travel; an information acquisition device disposed on the housing and used for acquiring external environment information; an energy module providing energy for the autonomous mower; and a control module connecting and controlling the mowing module, the traveling module, the information acquisition device and the energy module, to achieve automatic traveling and automatic working of the autonomous mower; wherein the autonomous mower further including an alarm module for making an alarm; the control module including an identification unit which receives the information acquired by the information acquisition device; the autonomous mower has a safety inspection working mode in which the identification unit analyzes and judges whether an abnormal object exists in the working area according to the information acquired by the information acquisition device; if the abnormal object exists, the control module controls the alarm module to send an alarm signal to the outside.

Preferably, the information acquisition device including an image acquisition device, and the identification unit analyzes and judges whether the abnormal object exists in the working area according to image information acquired by the image acquisition device.

Preferably, the identification unit identifies whether an object is an abnormal object according to the size or contour presented by the object in the image information.

Preferably, the identification unit including a face identification program which identifies a face and judges whether the identified face is a strange face, and if yes, judges whether an abnormal object exists in the working area.

Preferably, the image acquisition device is rotatably fixed onto the housing.

Preferably, the autonomous mower further including a driving device that drives the image acquisition device to make rotational motion, and the control module controls the rotational motion of the image acquisition device through the driving device.

Preferably, the information acquisition device including an infrared sensor through which the temperature is detected, and the identification unit judges whether an abnormal object exists in the working area according to whether the temperature is in a predetermined range or not.

Preferably, the alarm module including a luminous alarm device or a sounding alarm device disposed on the autonomous mower.

Preferably, the autonomous mower further including a wireless communication module which including a Wi-Fi module, a cellular communication module or a Bluetooth module.

Preferably, the alarm module transmits images, texts or audio alarm signals to the outside through the wireless communication module.

Preferably, the autonomous mower receives a control instruction sent by an external device through the wireless communication module, and controls its own work or travel according to the control instruction.

Preferably, when a parameter related to a working environment satisfies a preset condition, the control module starts the security patrol working mode.

Preferably, the control module including a path setting unit which is used for setting a patrol route, and the autonomous mower patrols according to the patrol route in the security patrol working mode.

The present invention further provides an autonomous mower, including a housing; mowing module received in the housing, and performing predetermined mowing work; a traveling module supporting the housing and driving the autonomous mower to travel; an information acquisition device disposed on the housing and used for collecting external environment information; an energy module providing energy for the autonomous mower; and a control module connecting and controlling the mowing module, the traveling module, the information acquisition device and the energy module, to achieve automatic traveling and automatic working of the autonomous mower; wherein the autonomous mower further including an alarm module for making an alarm; the control module including an identification result processing unit; the autonomous mower has a security patrol working mode in which the identification result processing unit sends the collected external environment information to an external device and receives an identification result analyzed and judged by the external device based on the information, and the identification result indicates whether an abnormal object exists in the working area; if the abnormal object exists, the control module controls the alarm module to send an alarm signal to the outside.

Preferably, the autonomous mower including a wireless communication module through which the identification result processing unit conducts communication with the external device.

Preferably, the information acquisition device including an image acquisition device, and the external environment information including image or video information collected by the image acquisition device.

Preferably, the information acquisition device including an infrared sensor, and the external environment information including temperature information of an outside object detected by the infrared sensor.

The autonomous mower including an alarm module for making an alarm, and the control module including an identification unit; the autonomous mower has a security patrol working mode in which the identification unit analyzes and judges whether an abnormal object exists in a working environment; if the abnormal object exists, the alarm module sends an alarm signal to the outside. Therefore, the autonomous mower can achieve a security patrol function in addition to having a function of trimming the lawn. The autonomous mower has multiple uses, so as to save the cost.

In view of this, it is necessary to provide an autonomous traveling device that can clean a lens.

The present invention provides an autonomous traveling device, which automatically travels and works in a working area, including: a housing; a working module received in said housing and performing predetermined work; a traveling module supporting said housing; an image acquisition device disposed on said housing, including a lens; an energy module providing energy for working and traveling of said autonomous traveling device; and a control module connecting and controlling said working module, said traveling module, said image acquisition device and said energy module, to achieve automatic traveling and automatic working of said autonomous traveling device; wherein said autonomous traveling device further including a cleaning device for keeping said lens clean.

Preferably, said autonomous traveling device further including a cleaning control unit which controls said cleaning device to clean said lens automatically according to a preset program.

Preferably, said cleaning device including a shielding sheet disposed on said lens which can be moved to shield or expose said lens, and said shielding sheet is provided thereon with a cleaning element that cleans said lens when said shielding sheet is moved.

Preferably, said cleaning element is a cleaning brush or flaky cleaning plate.

Preferably, said cleaning element is detachably installed on said shielding sheet.

Preferably, said cleaning device including a microfan disposed on said lens which produces air currents to clean said lens.

Preferably, said microfan including fan blades made of piezoelectric material, and high-frequency vibration of said fan blades produces said air currents.

Preferably, said cleaning device including a transparent cover that surrounds said image acquisition device therein and a cleaning element that cleans said transparent cover.

Preferably, said cleaning element including a cleaning brush fixed to one side of said image acquisition device opposite to said lens, said transparent cover is rotatable around said image acquisition device, and when said transparent cover rotates around said image acquisition device, said cleaning brush can clean said transparent cover.

Preferably, said cleaning brush is detachably installed on one side of said image acquisition device opposite to said lens.

Preferably, said transparent cover is driven through a motor, and automatically rotates around said image acquisition device.

Preferably, said cleaning element including a cleaning brush for cleaning said transparent cover, and said cleaning brush is located on an outer side of said transparent cover facing said lens.

Preferably, said cleaning brush is driven through a motor, and can reciprocate along the outer side of said transparent cover and automatically clean said transparent cover.

Preferably, said cleaning element including a spray device for cleaning said transparent cover, and said spray device is located on an outer side of said transparent cover facing the lens.

Preferably, said spray device including a water jet device or an air jet device, which cleans said transparent cover through sprayed water current or air current.

Preferably, said cleaning control unit compares the image collected by said image acquisition device in the preset position with a preset reference image, and when judging that they are different from each other, controls said lens cleaning device to perform a cleaning task.

Preferably, said autonomous traveling device including an alarm module, and said cleaning control unit compares said image acquisition device in the preset position with a preset reference image, and when judging that they are different from each other, controls said alarm module to send an alert signal.

The autonomous traveling device is provided with a cleaning device for keeping the lens clean, thus avoiding that an image or video shot by the lens is not clear and preventing that the autonomous traveling device's misjudgment of autonomous traveling device the lawns, the obstacles or the like caused by the unclear image or video results in the autonomous traveling device that autonomous traveling device cannot work normally.

DETAILED DESCRIPTION

Embodiments of the present invention are elaborated below with reference to the accompanying drawings, to enable the advantages and features of the present invention to be better understood by those skilled in the art, thus defining the protection scope of the present invention more clearly and definitely. The accompanying drawings merely provide reference and description, instead of being used to limit the present invention.

Figure 1:
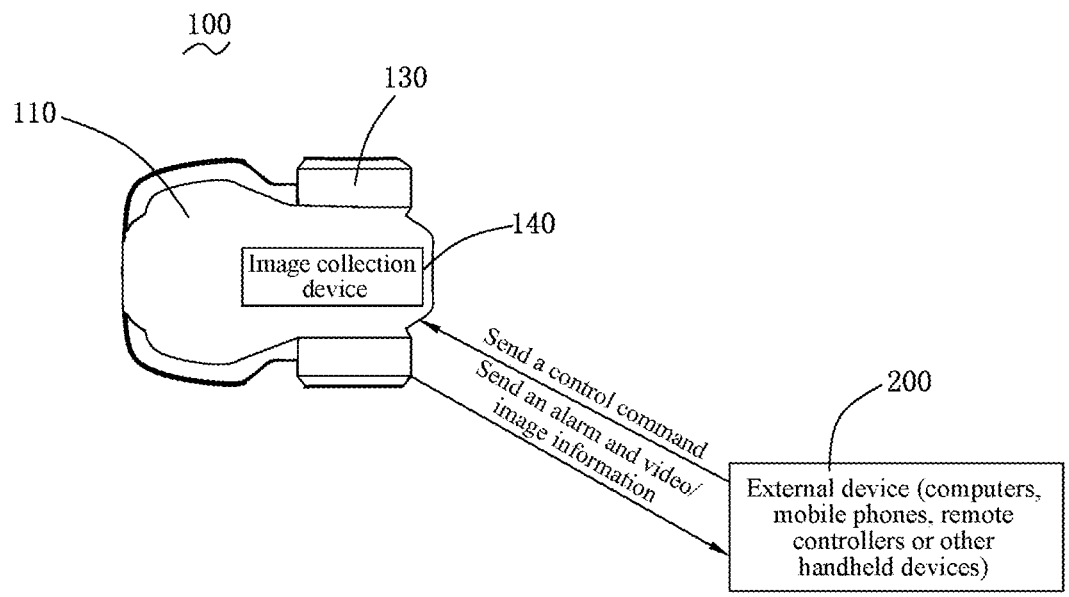
FIG. 1 is a schematic structural diagram of an autonomous mower according to one embodiment.
Figure 2:
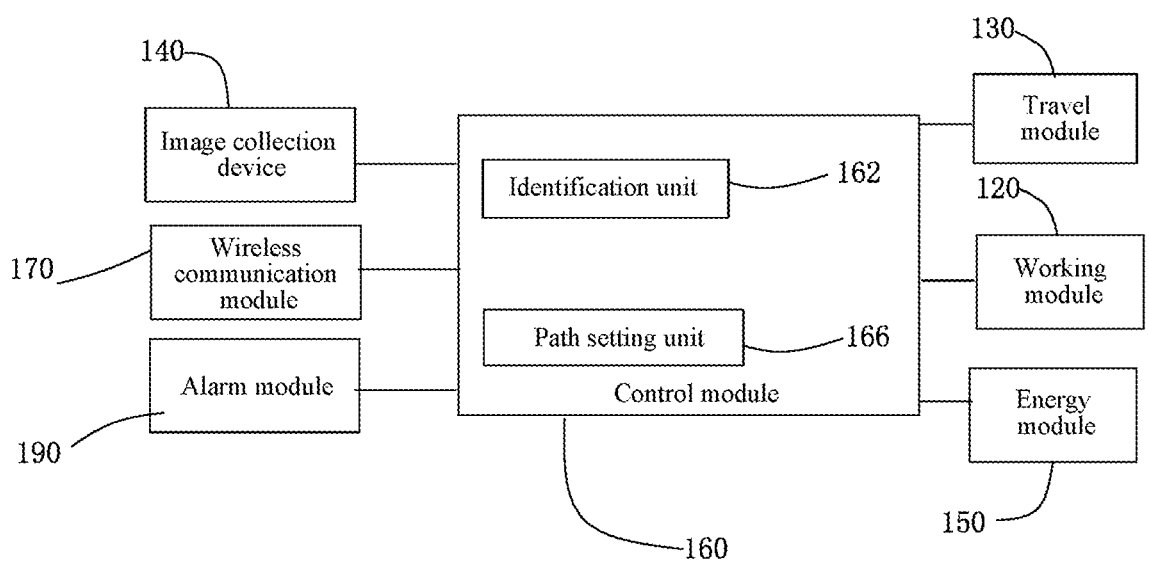
FIG. 2 is a schematic functional module diagram of the autonomous mower shown in FIG. 1.

Referring to FIG. 1 and FIG. 2, one embodiment of the present invention provides an autonomous mower 100. The autonomous mower 100 has a housing 110 and an information acquisition device installed on the housing 110. In one embodiment, the information acquisition device is an image acquisition device 140. The image acquisition device 140 shoots a target region of the autonomous mower 100 so as to form an image. The autonomous mower 100 further including a working module 120, a traveling module 130, an energy module 150, a control module 160 and an alarm module 190. The control module 160 connects and controls the traveling module 130, the working module 120, the energy module 15 and the image acquisition device 140.

In this embodiment, the working module 120 is a mowing module, which is specifically a cutting component, for example, a cutting blade. The working module 120 is driven to work by a cutting motor (not shown). The center of the working module 120 is located on a central axis of the autonomous mower 100, disposed below the housing 110, and located between auxiliary wheels and driving wheels.

The traveling module 130 including a wheel set and a traveling motor that drives the wheel set. The wheel set may be set in many methods. Generally, the wheel set including a driving wheel driven by the traveling motor and an auxiliary wheel that assists in supporting the housing 110, the number of the driving wheels may be one, two or more, and the auxiliary wheel may also be correspondingly set as one, two or more. In this embodiment, the number of the driving wheels of the autonomous mower 100 is two, which are respectively a right driving wheel on the right and a left driving wheel on the left. The right driving wheel and the left driving wheel are symmetrically disposed about the central axis of the autonomous mower 100. The center of the auxiliary wheel is located on the central axis. The right driving wheel and the left driving wheel are preferably located in the back of the housing 110, and the auxiliary wheel is located in the front. Certainly, in other embodiments, they may also be replaced with each other.

In this embodiment, the right driving wheel and the left driving wheel mate with a driving motor respectively, to achieve differential output to control steering. The driving motor may be directly connected with the driving wheel, but it is also possible to dispose a transmission device between the driving motor and the driving wheel, such as the planetary gear train common in this technical field. In other embodiments, it is also possible to set two driving wheels and one driving motor, and in this case, the driving motor drives the right driving wheel through a first transmission device and drives the left driving wheel through a second transmission device. That is, the same motor drives the right driving wheel and the left driving wheel through different transmission devices.

The image acquisition device 140 is installed to a top position in the front of the housing 110, and is preferably disposed in the middle and collects image information of a target region. In this embodiment, a view-finding range of the image acquisition device 140 has different viewing angle ranges according to different acquisition device types, for example, a viewing angle range from 90 degrees to 120 degrees. Certainly, in a specific implementation process, a certain angle range in the viewing angle range can be selected as an actual view-finding range, for example, a range of 90 degrees in the middle of the viewing angle range of 120 degrees is selected as an actual view-finding range.

In one embodiment, the image acquisition device 140 is rotatably fixed onto the housing 110. The autonomous mower 100 is provided with a driving device that drives the image acquisition device 140 to make rotational motion. The control module 160 is connected with the driving device, and can control the image acquisition device 140 to make rotational motion through the driving device. Through the rotational motion, the image acquisition device 140 has multiple perspectives.

In one embodiment, the image acquisition device 140 of the autonomous mower 100 may also be installed with an illuminating lamp. The illuminating lamp can rotate along with the image acquisition device 140. When the light is dark and a suspicious object is found, it is possible to make the image shot by the image acquisition device 140 clearer by turning on the illuminating lamp, to facilitate identification of the suspicious object, thus facilitating judgment on how to deal with this.

The energy module 150 is used for providing energy for operation of the autonomous mower 100. The energy of the energy module 150 may be gasoline, battery pack or the like, and in this embodiment, the energy module 150 including a rechargeable battery pack disposed in the housing 110. During work, the battery pack releases electric energy to maintain working and traveling of the autonomous mower 100. During non-work, the battery can be connected to an external power source to supplement electric energy. Particularly, by a more humanized design, when it is detected that the capacity of the battery is insufficient, the autonomous mower 100 may automatically look for a charging station to supplement electric energy.

The control module 160 is used for controlling working and traveling of the autonomous mower 100. As shown in FIG. 2, the control module 160 including an identification unit 162. The identification unit 162 is used for analyzing the image information acquired by the image acquisition device 140, and identifying whether an abnormal object exists in a working environment.

The identification unit 162 identifies whether an object is an abnormal object according to the size or contour presented by the object in the image information. A specific implementation mode is as follows: the identification unit 162 is provided with a particular program, and judges from the image information whether the abnormal object exists in the working environment. In one embodiment, the particular program in the identification unit 162 judges whether content in the image information achieves the particular size or particular contour through an algorithm such as image segmentation or image extraction, so as to judge whether the abnormal object exists in the working environment.

The identification unit 162 can compare the content in the image information obtained in real time with content in a storage unit, so as to judge whether the abnormal object exists in the working environment. In one embodiment, the autonomous mower 100 is provided with a storage unit which stores features of the abnormal object or features of a non-abnormal object, and the identification unit 162 compares the image information with content in the storage unit through an image matching algorithm, judges that the abnormal object exists in the working environment when the features of the abnormal object are present, and judges that the abnormal object exists in the working environment when other features of the non-abnormal object are present.

In one embodiment, the identification unit 162 including a face identification program which judges whether the working environment is invaded by someone. A specific implementation process is as follows: the identification unit 162 detects whether there is a face in the image obtained in real time through the face identification program (e.g., a template-based matching algorithm, a singular value-based feature algorithm, a subspace analysis algorithm, a principal component analysis algorithm and so on). If a detection result is that the image including a face, it indicates that the working environment is invaded. In one embodiment, the autonomous mower is provided with a storage unit inside which stores, face image of users and particular member. After the identification unit 162 detects that the image including a face, the identification unit 162 compares features of the face with face features set in the storage unit, and if they are different, it indicates that the working environment is invaded by a stranger. Through face comparison, the autonomous mower 100 becomes more intelligent, and can distinguish strangers from non-strangers. Only when a stranger appears, will the alarm module 190 send an alarm signal to the outside.

In one embodiment, the information acquisition device is an infrared sensor. The autonomous mower 100 detects the temperature through the infrared sensor, and the identification unit 162 judges whether the abnormal object exists in the working environment according to whether the temperature is in a predetermined range. The autonomous mower 100 detects the temperature of the object appearing in the working environment through the infrared sensor, and if the detected temperature is in the predetermined range, for example, 36.0° C.-37.8° C., the identification unit 162 judges that the abnormal object exists in the working environment. In this embodiment, the predetermined temperature range is set with the assumption that the abnormal object is human being, and when the abnormal object is another animal or object, the predetermined temperature range may be changed correspondingly.

When the identification unit 162 judges that the abnormal object exists in the image information, the alarm module 192 may send an alarm signal to the outside. In one embodiment, the autonomous mower 100 may be provided with an alarm device, for example, a sounding device (police whistle), a luminous device and so on, and after the alarm module 190 receives information of the abnormal object, the alarm device is started to make an alarm. In one embodiment, the autonomous mower 100 is not provided with an alarm device, and after the alarm module 190 receives information of the abnormal object, a wireless communication module 170 can be started, and an alarm signal is sent to an external device 200 through the wireless communication module 170. The alarm signal may be an image acquired in real time, text reminding information of the abnormal object, an Email of text alarm prompt content or special audio or the like. The external device may be a personal mobile device such as a computer, a mobile phone or a remote controller.

In one embodiment, the wireless communication module 170 may be a wi-fi communication module or a cellular mobile communication module or a Bluetooth module. The autonomous mower 100 not only can transmit the image information or alarm signal to the external device 200 through the wireless communication module 170, but also can receive control information of the external device 200 through the wireless communication module 170. The autonomous mower 100 can work and travel according to the control information of the external device 200, for example, it controls whether the autonomous mower 100 is in a mowing working mode or a security patrol mode, it controls whether the autonomous mower 100 stops, and it controls whether the image acquisition device 140 moves such as rotating.

In one embodiment, the autonomous mower 100 transmits the information collected by the information acquisition device to the external device 200 through the wireless communication module 170. The external device 200 makes a corresponding control instruction according to the received information. The control module 160 of the autonomous mower 100 including an identification result processing unit 164 which receives the control instruction sent by the external device 200 through the wireless communication module 170, and the autonomous mower 100 controls its own travel or work according to the control instruction, for example, it controls whether the autonomous mower 100 is in a mowing working mode or a security patrol mode, it controls whether the autonomous mower 100 stops, and it controls whether the autonomous mower 100 moves such as rotating.

Through cooperation between the identification unit 162 and the alarm module 190, the autonomous mower 100 can achieve a function of security patrol, that is, the autonomous mower 100 not only has a working mode of trimming the lawn like an ordinary autonomous mower, but also has a security patrol working mode.

In the security patrol working mode, the patrol route of the autonomous mower 100 may be different from its mowing path. In one embodiment, the control module 160 is provided with a path setting unit 166. The path setting unit 166 can set the rule of the patrolled path according to requirements of the working environment: for example, some places easy to be invaded by abnormal objects are patrolled multiple times at a fixed point, or patrolled in a particular time, and so on.

There are lots of manners in which the autonomous mower 100 starts the security patrol working mode, for example, a user starts it manually, the autonomous mower 100 is provided with a working mode select button, and the user manually selects the mowing working mode or the security patrol working mode through the button. For example, the user starts the autonomous mower 100 remotely through the external device 200 (a personal mobile device such as a mobile phone, a computer, a pad or a remote controller), the control module 160 of the autonomous mower 100 is provided inside with a client module corresponding to the personal mobile device, and the personal mobile device chooses to start the mowing working mode or the security patrol working mode through the matched client module. For example, the control module 160 of the autonomous mower 100 is provided with a predetermined program, and the security patrol working mode or the mowing working mode will be started automatically when some conditions in the working environment meet a predetermined condition. In one embodiment, the starting program set in the control module 160 starts different working modes of the autonomous mower 100 according to different time, for example, the autonomous mower 100 starts the mowing working mode during the daytime, and starts the security patrol working mode at night; the autonomous mower 100 starts the mowing working mode in spring and summer, and starts the security patrol working mode in autumn and winter. In one embodiment, the control module 160 starts different working modes according to whether the wireless communication module 170 of the autonomous mower 100 is in a communication state. When the wireless communication module 170 is in the communication state, it represents that the user is within a range near the working environment, that is, the autonomous mower 100 starts the mowing working mode; when the wireless communication module 170 is in a non-communication state, it represents that the user may go out, and the autonomous mower 100 starts the security patrol working mode.

How the autonomous mower 100 works is specifically introduced below.

Firstly, the autonomous mower 100 has a function of trimming the lawn like the common autonomous mower. When the autonomous mower 100 is required to trim the lawn, it is only necessary to turn on the corresponding switch, and its work is the same as that of the common autonomous mower. After the mowing switch of the autonomous mower 100 is turned on, the autonomous mower 100 can mow automatically according to a set program. It is also feasible to control the autonomous mower 100 to perform a mowing operation through the external device 200 (a personal mobile device such as a computer, a mobile phone or a remote controller).

Secondly, the autonomous mower 100 also has a security patrol function. When the autonomous mower 100 is required to carry out security patrol, the autonomous mower 100 is adjusted to the security patrol working mode. The security patrol function of the autonomous mower 100 and the function of trimming the lawn can be opened simultaneously, and may also be opened separately. The security patrol function of the autonomous mower 100 has two implementation modes, one is a full-automatic patrol working mode, and the other is a semi-automatic patrol working mode, Users can choose to use the autonomous mower in whether full-automatic patrol working mode or semi-automatic patrol working mode based on the actual needs When the autonomous mower 100 works in the full-automatic patrol working mode, the control module 160 of the autonomous mower 100 will control the traveling module 130 to work and make the autonomous mower 100 patrol along the patrol path set by the path setting unit 166. When the autonomous mower 100 is in a traveling process, the image acquisition device 140 will also work to shoot surroundings. The image shot by the image acquisition device 140 will be transferred to the identification unit 162, and the identification unit 162 analyzes the shot image to determine whether the image acquisition device 140 shoots an abnormal object. The abnormal object herein can be judged according to the size and or whether the shot object is moving. For example, when the shot moving object reaches the specified size, the object is considered to be an abnormal object, the alarm module 190 sends an alarm signal to the outside. Herein, the moving object of a specified size including human beings, cars, dogs and the like, and the specified size may be more than 30 cm long or tall. In addition, the image shot by the image acquisition device 140 may also not be processed by the identification unit 162, but be transferred to the external device 200 directly through the wireless communication module 170, and the external device 200 herein, for example, is a computer, a mobile phone, a remote controller or the like. The external device 200, after receiving the shot image, may process the image to judge whether an abnormal object exists, and the image may also be identified by a operator or a user, to judge whether an abnormal object exists. After an abnormal object is found, the alarm module 190 sends an alarm signal to the outside. The alarm module 190 may send an alarm sound or alarm image or information. After hearing the alarm sound or seeing the alarm image or information, the operator or the user may manipulate the autonomous mower 100 to perform next action through the external device 200. For example, the user may transmit a control signal to the autonomous mower 100 through the external device 200, after the autonomous mower 100 receives the control signal through the wireless communication module 170, the control signal is processed by the control module 160, and after processing, the control module 160 will accordingly turn on the camera light to obtain a clear image, reset alarm, travel to a dangerous object or the like. In this way, the autonomous mower 100 has functions of making an alarm after security patrol and finding a danger and processing the danger by the operator or the like. At the same time, as the autonomous mower 100 also has the function of trimming the lawn, the autonomous mower 100 has an advantage of being a multipurpose device. Thus, only by purchasing one device, can the functions of trimming the lawn and security patrol be achieved, achieving the aim of saving the cost.

When the user selects that the autonomous mower 100 works in the semi-automatic security patrol working mode, the user can see image information content displayed by a monitor or the external device 200 and then send a control command to the autonomous mower 100 through the external device 200, so as to control movement of the autonomous mower 100, facilitating the user to see a region that he/she desires to observe. At the same time, the user may also control the image acquisition device 140 to rotate through the external device 200 or turn on the camera light to better observe the region that he/she desires to observe. The wireless communication module 170 of the autonomous mower 100 will receive the control signal sent by the external device 200, and may also transfer the image shot by the image acquisition device 140 to the external device 200 or the monitor and so on. After processing the signal received by the wireless communication module 170, the control module 160 will control the work of the image acquisition device 140, the traveling module 130, the working module 120 and other devices according to a processing result. When finding an abnormal object, the user may control further actions of the image acquisition device 140, the traveling module 130, the alarm module 190 and the like of the autonomous mower 100 through the external device 200. For example, the user controls the autonomous mower 100 to stop moving, controls the alarm module 190 to make an alarm or the like through the external device 200.

The housing of the autonomous mower is provided thereon with an image acquisition device, the housing is provided therein with a working module, a traveling module and a control module, and in this way, the identification unit in the control module can control the alarm module to make an alarm by analyzing the image shot by the image acquisition device or the temperature detected by the infrared sensor. Therefore, the mower may also achieve a function of security patrol in addition to having the function of trimming the lawn. The mower has an advantage of being a multipurpose device, and achieving function of both mowing and monitoring without manufacturing two devices, thus achieving the advantage of saving the manufacturing cost.

The image acquisition device 140 including a lens 142. The lens 142 is used for shooting a video image in a working area of the autonomous mower 100. The lens 142 may lead to an unclear image if not being cleaned, and the unclear image will lead to the machine's misjudgment of the lawn, the barrier and the like, with result that the mower cannot work normally. To solve such a problem, the autonomous mower 100 is provided with a cleaning device 143 for keeping the lens 142 clean. The user can manually clean the lens 142 through the cleaning device 143.

In one embodiment, the autonomous mower 100 is further provided with a cleaning control unit 168 which controls the cleaning device 143 to automatically clean the lens 142 according to a preset program. In this embodiment, the lens 142 can be kept clean without user participation.

In one embodiment, the cleaning device 143 including a shielding sheet 145 disposed on the lens 142 and a cleaning element 147 disposed on the shielding sheet 145. The shielding sheet 145 is movable relative to the lens 142. When the shielding sheet 145 moves relative to the lens 142, the cleaning element 147 can clean the lens 142, making the lens 142 become clean, thus shooting a clear image.

Figure 3:
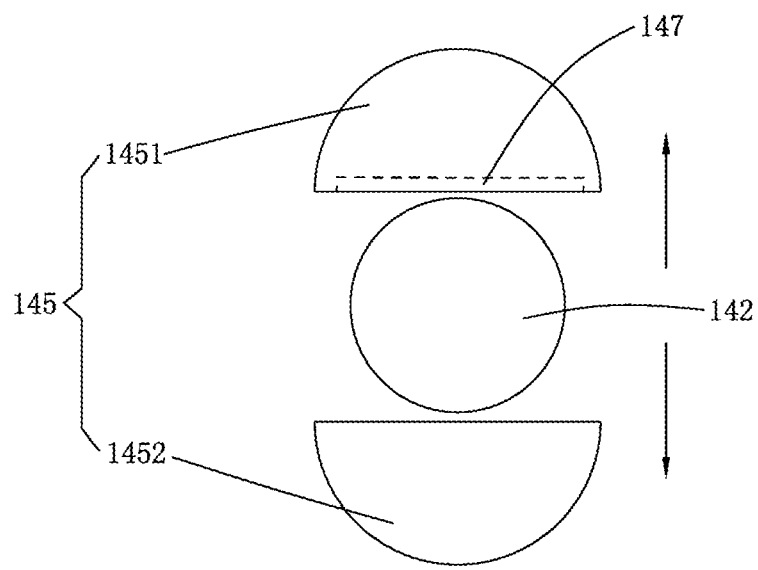
FIG. 3 is a schematic diagram illustrating that a shielding sheet of a lens cleaning device is in a completely open state according to one embodiment.
Figure 4:
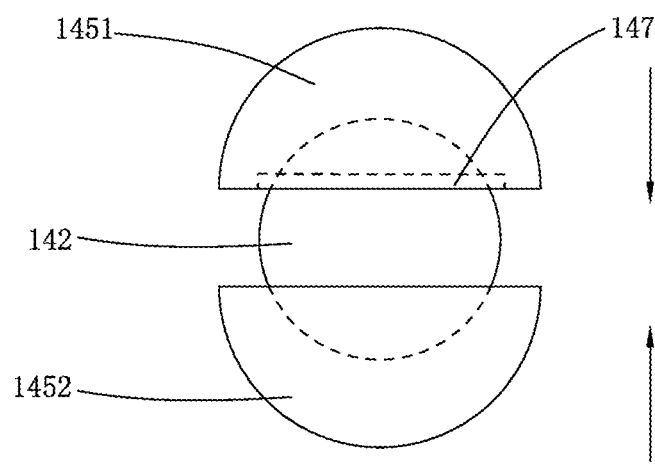
FIG. 4 is a schematic diagram illustrating that the shielding sheet of the lens cleaning device is in a partially open state according to the embodiment shown in FIG. 3.
Figure 5:
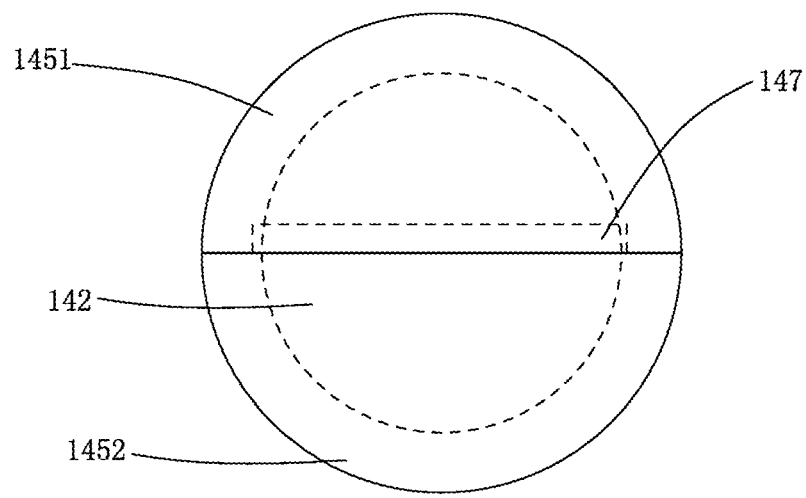
FIG. 5 is a schematic diagram illustrating that the shielding sheet of the lens cleaning device is in a folded state according to the embodiment shown in FIG. 3.

Referring to FIG. 3 to FIG. 5, the shielding sheet 145 including a first shielding sheet 1451 and a second shielding sheet 1452. The first shielding sheet 1451 and the second shielding sheet 1452 can be folded with or separated from each other, the lens 142 is shielded when the first shielding sheet 1451 and the second shielding sheet 1452 are folded, and the lens 142 is exposed when the first shielding sheet 1451 and the second shielding sheet 1452 are separated. It should be noted that the shielding sheet 145 may also be integral, and may not be necessarily set as two parts. The first shielding sheet 1451 and the second shielding sheet 1452 may move up and down and may also move left and right.

In this embodiment, the cleaning element 147 is a cleaning brush, which may be set as one or more, and the cleaning element 147 may be disposed on one or both of the first shielding sheet 1451 and the second shielding sheet 1452. The cleaning element 147 may also be a flaky cleaning plate which, in use, can be coated with a detergent to improve a cleaning effect.

In one embodiment, the cleaning element 147 is detachably installed on the shielding sheet 145. After the cleaning element 147 works for a period of time, the user can remove the cleaning element 147, then install and use it after cleaning it; or after the cleaning element 147 is damaged, the user can remove the cleaning element 147 and replace it with a new one.

As shown in FIG. 3 and FIG. 4, when the image acquisition device 140 of the autonomous mower 100 is working the first shielding sheet 1451 and the second shielding sheet 1452 are separated to expose the lens 142; as shown in FIG. 5, when the image acquisition device 140 are not working, the first shielding sheet 1451 and the second shielding sheet 1452 are folded and shield the lens 142. When it is necessary to clean the lens 142, the first shielding sheet 1451 and the second shielding sheet 1452 of the shielding sheet 145 are folded along the arrow head direction shown in FIG. 4, and during folding, the cleaning element 147 can clean the lens 142. Certainly, in the process that the first shielding sheet 1451 and the second shielding sheet 1452 are separated along the arrow head direction shown in FIG. 3, the cleaning element 147 can also clean the lens 142.

Figure 6:
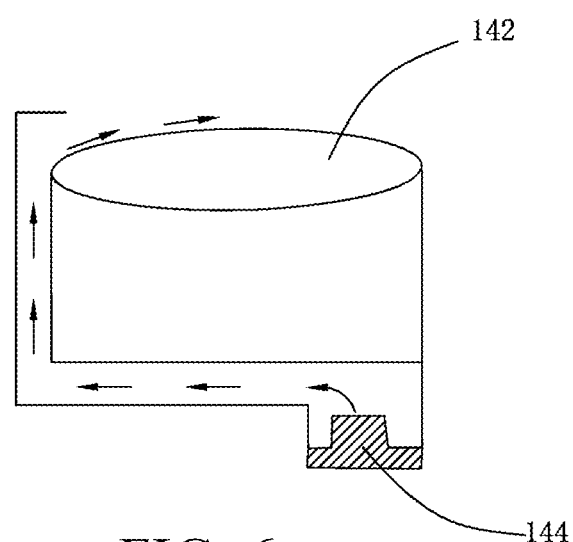
FIG. 6 is a schematic diagram of a lens cleaning device of a microfan according to one embodiment.

In one embodiment, the cleaning device 143 including a micro fan 144 disposed on the lens 142. As shown in FIG. 6, an air current produced through the microfan 144 cleans the lens 142. The fan needs to be disposed in a manner of mating with the lens 142, and the size thereof should adapt to the size of the lens 142. The microfan 144 including blades made of a piezoelectric material, and the microfan 144 makes high-frequency vibration by a driving circuit driving the blades, for example, the vibration frequency reaches 26000 times per second. Through vibration of the piezoelectric material, the blades may produce air currents, and the air currents will blow away foul or steam on the lens 142 when flowing through an air duct, thus achieving a cleaning effect. Those skilled in the art can think of that the microfan 144 may also be an ordinary fan, which can also achieve the aim of cleaning the lens 142 as long as its air current is great enough.

Those skilled in the art can think of that, besides the single-duct design shown in FIG. 6, the air duct may be designed in a diversified manner. For example, through the multiple-duct design, or when the positional relationship between the microfan 144 and the lens 142 changes, the aim of the present invention can be achieved as long as wind produced by the microfan 144 can be blown to the lens 142.

In one embodiment, the cleaning device 143 including a transparent cover 146 that surrounds the image acquisition device 140 therein and a cleaning element 147 for cleaning the transparent cover 146. The transparent cover 146 surrounds the image acquisition device 140, the foul such as dust cannot directly come into contact with the lens 142, and thus the effect of keeping the lens 142 clean can be achieved only by cleaning the transparent cover 146.

Figure 7:
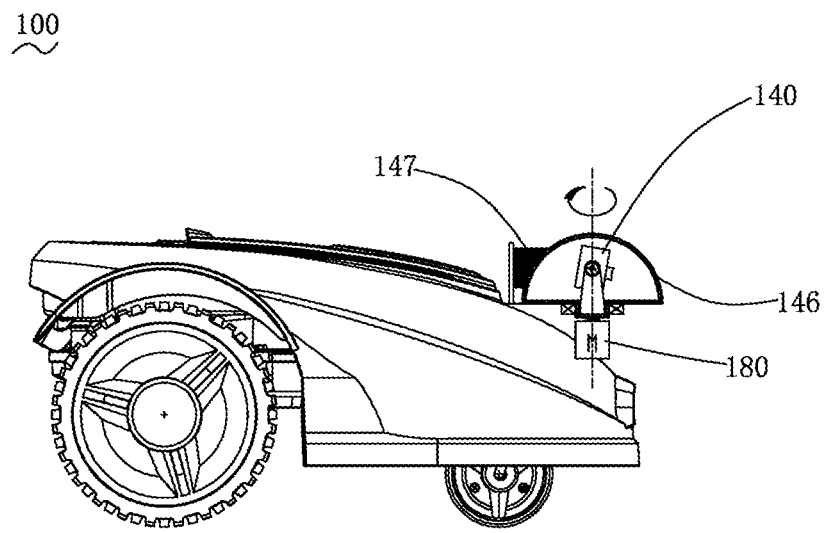
FIG. 7 is a schematic diagram of a transparent cover and a cleaning device of a cleaning brush according to one embodiment.

As shown in FIG. 7, in this embodiment, the cleaning element 147 is a cleaning brush installed on one side of the image acquisition device 140 opposite to the lens 142. The cleaning brush is detachably installed on one side of the image acquisition device 140 opposite to the lens 142, so that the user can remove the cleaning brush for cleaning or replacement. The transparent cover 146 can rotate around the image acquisition device 140 along the direction of the arrow shown in FIG. 7. When the transparent cover 146 rotates, the cleaning brush 147 can clean the transparent cover 146. Rotation of the transparent cover 146 may be driven by a driving motor 180 alone, and may also share the driving motor existing in the autonomous mower 100.

Figure 8:
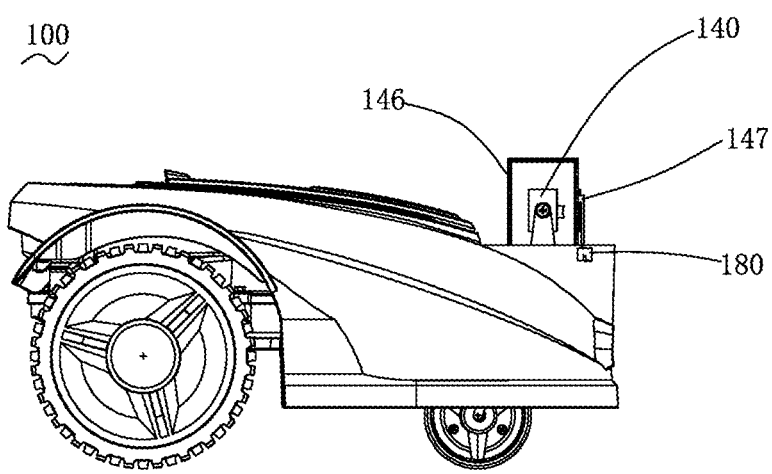
FIG. 8 is a schematic diagram of a transparent cover and a cleaning device of a cleaning brush according to another embodiment.

As shown in FIG. 8, in one embodiment, the cleaning element 147 is a cleaning brush. The cleaning brush 147 is located on an outer side of the transparent cover 146 opposite the lens 142. The cleaning brush 147 is driven through the driving motor 180, and can reciprocate along the outer side of the transparent cover, so as to clean the range in which the transparent cover 146 faces the lens 142. Certainly, rotation of the cleaning brush 147 may be driven by the driving motor 180 alone, and may also share the driving motor existing in the autonomous mower 100.

Figure 9:
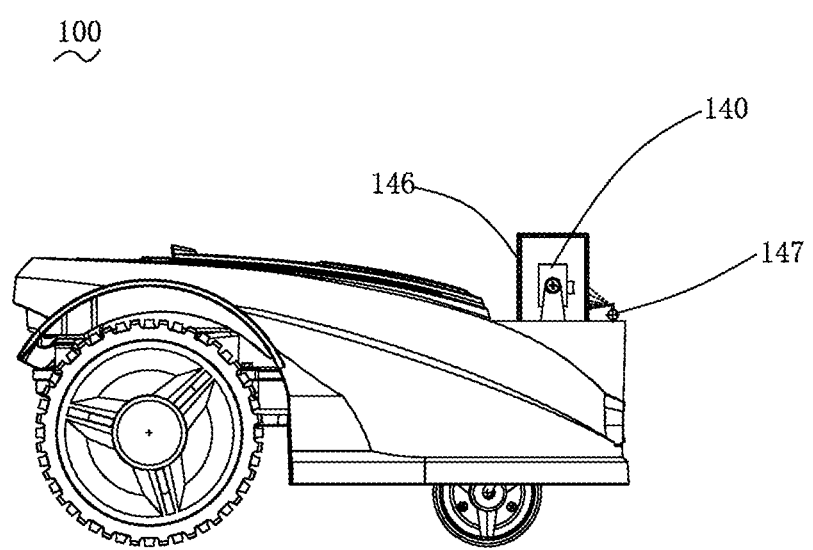
FIG. 9 is a schematic diagram of a transparent cover and a cleaning device of a spray device according to one embodiment.

As shown in FIG. 9, in one embodiment, the cleaning element 147 is a spray device. The spray device 147 is located on an outer side of the transparent cover 146 directly facing the lens 142. The spray device 147 may be a water jet device or an air jet device, which cleans the transparent dust cover 146 through a sprayed water current or air current.

Cleaning the lens 142 of the image acquisition device 140 of the autonomous mower 100 can be achieved in many manners, for example, a pure manual cleaning mode, a semi-automatic cleaning mode and a full-automatic cleaning mode. A cleaning mode is introduced below in detail only by taking that the cleaning device 143 including a shielding sheet 145 and a cleaning element 147 as an example, and cleaning manners in other embodiments are similar to the implementation process of this embodiment.

The pure manual cleaning mode: the user manually controls the shielding sheet 145 to clean the lens, and the cleaning frequency of the lens 142 can be obtained through experience. For example, if the autonomous mower 100 works in a certain particular scenario for a long time, the user can easily know how soon the cleaning must be made after the lens 142 works, and otherwise, the effect of shooting the image by the lens 142 may be affected. Similarly, the cleaning frequency of the lens 142 in different working scenarios can be obtained through experience. In this way, during working of the autonomous mower 100, the user periodically cleans the lens 142 according to a specific scenario, and during cleaning, it is feasible that the first shielding sheet 1451 and the second shielding sheet 1452 of the shielding sheet 145 are folded.

The semi-automatic cleaning mode: the following problems may be brought about when the time for cleaning the lens 142 is judged merely relying on experience: if the cleaning is done too early, at this point, the image acquisition device 140 may also shoot a clear enough image, and the working efficiency of the autonomous mower 100 may be affected; if the cleaning is done too late, the working efficiency of the lens 142 has become low, and danger of the autonomous mower 100 during work may be increased, which even causes that the autonomous mower 100 cannot work normally. In one embodiment, the cleaning control unit 168 compares a real-time image acquired by the image acquisition device 140 when the autonomous mower 100 is in a preset position with a preset reference image, and when judging that they are different, controls the alarm module 190 to make an alarm. The reference image is an image collected in a particular scenario when the lens 142 is clean, and the shooting position is identical to the preset position, which ensures that the scenario of the real-time image is identical to that of the reference image. In one embodiment, the autonomous mower 100 can collect a real-time image to be compared with the reference image each time before it starts from a charging station or a starting station, and when judging that they are different, controls the alarm module 190 to make an alarm. At this point, the reference image is an image collected in the position of the charging station or the starting station when the lens 142 is clean. In this way, the user can stop the mower timely, then manually operate the shielding sheet 145, and clean the lens 142 by using the cleaning element 147 thereon. Such a semi-automatic mode, compared with the pure manual mode, improves the cleaning efficiency more greatly, and affects the normal work of the autonomous mower 100 less. The alarm module 190 may be a sounding system or a luminous system, or a mobile device (such as a mobile phone or a computer) transmitted to the user through communication.

The full-automatic cleaning mode: in one embodiment, the cleaning control unit 168 compares a real-time image collected by the image acquisition device 140 when the autonomous mower 100 is in a preset position with a preset reference image, and when judging that they are different, controls the shielding sheet 145 to move and clean the lens 142. The reference image is an image collected in a particular scenario in the case of ensuring that the lens 142 is clean, and the position where the real-time image is collected is identical to the preset position, which ensures that the scenario of the real-time image is identical to that of the reference image. In this way, automatic cleaning of the lens 142 is achieved, and efficient work of the mower can be ensured even if the user does not stop the mower. In one embodiment, the autonomous mower 100 can collect a real-time image to compare with the reference image each time before it starts from a charging station or a starting station, and when judging that they are different, controls the shielding sheet 145 to move and clean the lens 142. At this point, the reference image is an image collected in the position of the charging station or the starting station when the lens 142 is clean.

The autonomous mower 100 of the present invention, by providing a cleaning device 143, not only can manually clean the lens but also can achieve full-automatic cleaning of the lens, which can avoid that the image shot by the lens 142 is not clear and prevent the mower's misjudgment of the lawn, the obstacle and the like caused by the unclear image results in unnormal work of the mower.

The above embodiments merely express several implementation modes of the present invention, and the description thereof is relatively specific and detailed, which cannot be thus understood as limitations to the patent scope of the present invention. It should be noted that, for those of ordinary skill in the art, several transformations and improvements can also be made without departing from the concept of the present invention, which all belong to the protection scope of the present invention. Therefore, the protection scope of the patent of the present invention should be subject to the appended claims.

What claimed is:

1. An autonomous mower which automatically travels and works in a working area, the autonomous mower comprising:
   a housing;
   a mowing module received in the housing, and performing predetermined mowing work;
   a traveling module supporting the housing and driving the autonomous mower to travel in a working area;
   an information acquisition device disposed on the housing and used for acquiring external environment information;
   an energy module providing energy for the autonomous mower; and a control module connecting and controlling the mowing module, the traveling module, the information acquisition device and the energy module, to achieve automatic traveling and automatic working of the autonomous mower; and
   an alarm module for making an alarm,
   the control module comprising an identification unit which receives the external environment information acquired by the information acquisition device;
   the autonomous mower comprising a security patrol working mode in which the identification unit of the control module analyzes and judges whether an abnormal object exists in the working area according to the external environment information acquired by the information acquisition device and, if an abnormal object exists, the control module controls the alarm module to send an alarm signal to the outside,
   further comprising either (a) or (b):
   (a) when a parameter related to a working environment satisfies a preset condition, the control module starts the security patrol working mode, or
   (b) the control module comprises a path setting unit which is used for setting a patrol route, and the autonomous mower patrols according to the patrol route in the security patrol working mode, wherein the patrol route is different to the mowing path of the mower.

2. The autonomous mower according to claim 1, the information acquisition device comprises an image acquisition device, and the identification unit analyzes and judges whether an abnormal object exists in the working area according to image information acquired by the image acquisition device.

3. The autonomous mower according to claim 2, the identification unit identifies whether an abnormal object exists according to the size or contour presented by the object in the image information.

4. The autonomous mower according to claim 2, the identification unit comprises a face identification program which identifies a face and judges whether the identified face is a strange face, and if the face is identified as a strange face, the identification unit judges whether an abnormal object exists in the working area.

5. The autonomous mower according to claim 2, the image acquisition device is rotatably fixed onto the housing.

6. The autonomous mower according to claim 5, the autonomous mower further including a driving device that drives the image acquisition device to make rotational motion, and the control module controls the rotational motion of the image acquisition device through the driving device.

7. The autonomous mower according to claim 1, the information acquisition device comprises an infrared sensor through which a temperature is detected, and the identification unit judges whether an abnormal object exists in the working area according to whether the temperature is in a predetermined range or not.

8. The autonomous mower according to claim 1, further comprising a wireless communication module including a Wi-Fi module, a cellular communication module or a Bluetooth module.

9. The autonomous mower according to claim 8, the alarm module transmits images, texts or audio alarm signals to the outside through the wireless communication module.

10. The autonomous mower according to claim 8, the autonomous mower receives a control instruction sent by an external device through the wireless communication module, and controls its own work or travel according to the control instruction.

11. The autonomous mower according to claim 2, wherein the image acquisition device comprises a lens and wherein the autonomous mower comprises a cleaning device for keeping said lens clean.

12. The autonomous mower according to claim 11, wherein the autonomous mower further comprises a cleaning control unit configured to control said cleaning device to clean said lens automatically according to a preset program, wherein the cleaning control unit is configured to compare a real-time image acquired by said image acquisition device in a preset position with a preset reference image, and when judging that they are different from each other, control said lens cleaning device to perform a cleaning task.

13. The autonomous device according to claim 11, wherein the autonomous mower further comprises a cleaning control unit, said cleaning control unit is configured to compare a real-time image acquired by said image acquisition device in a preset position with a preset reference image, and when judging that they are different from each other, control said alarm module to make an alarm.

* * * * *